Figure 1B:
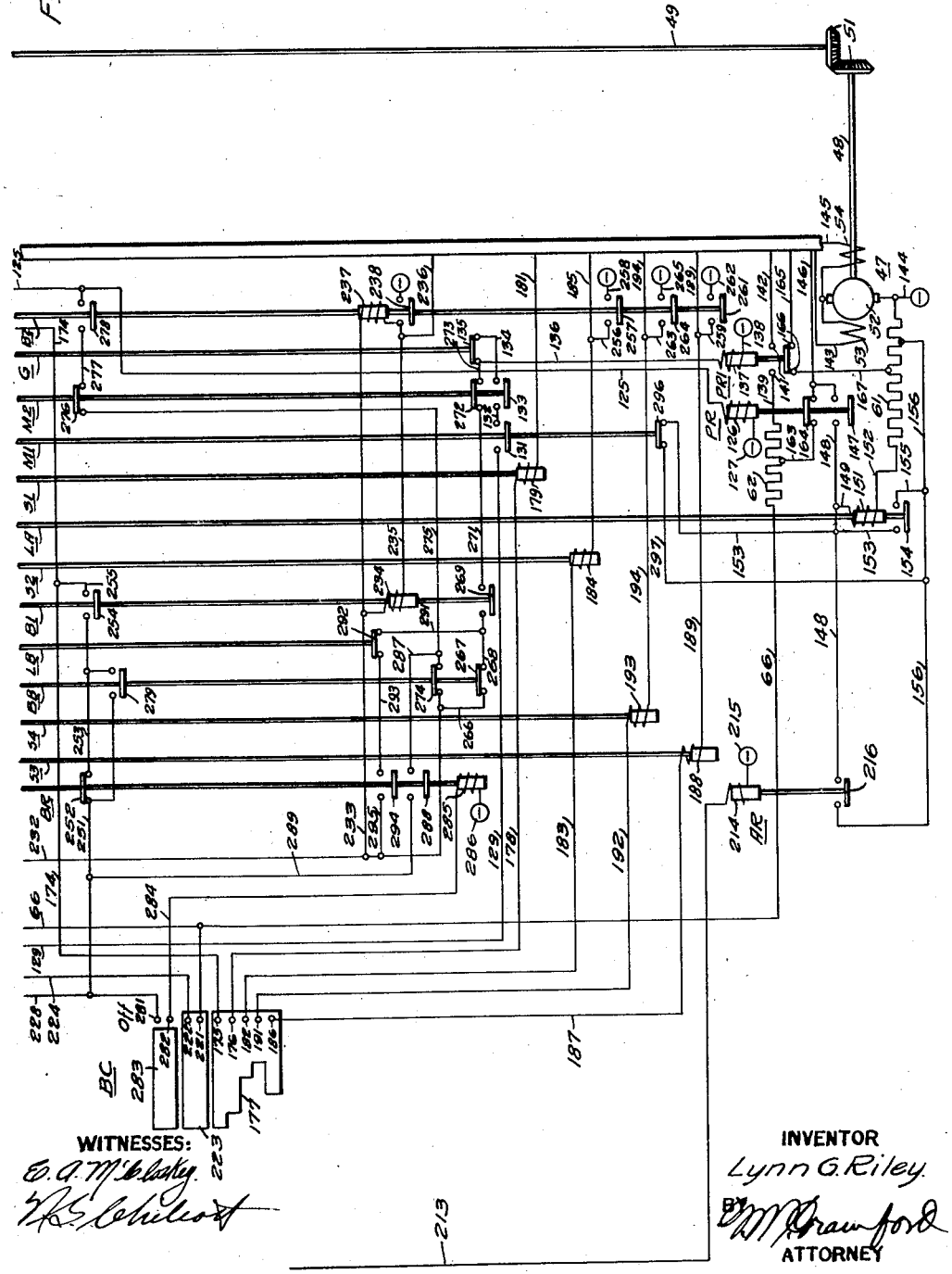

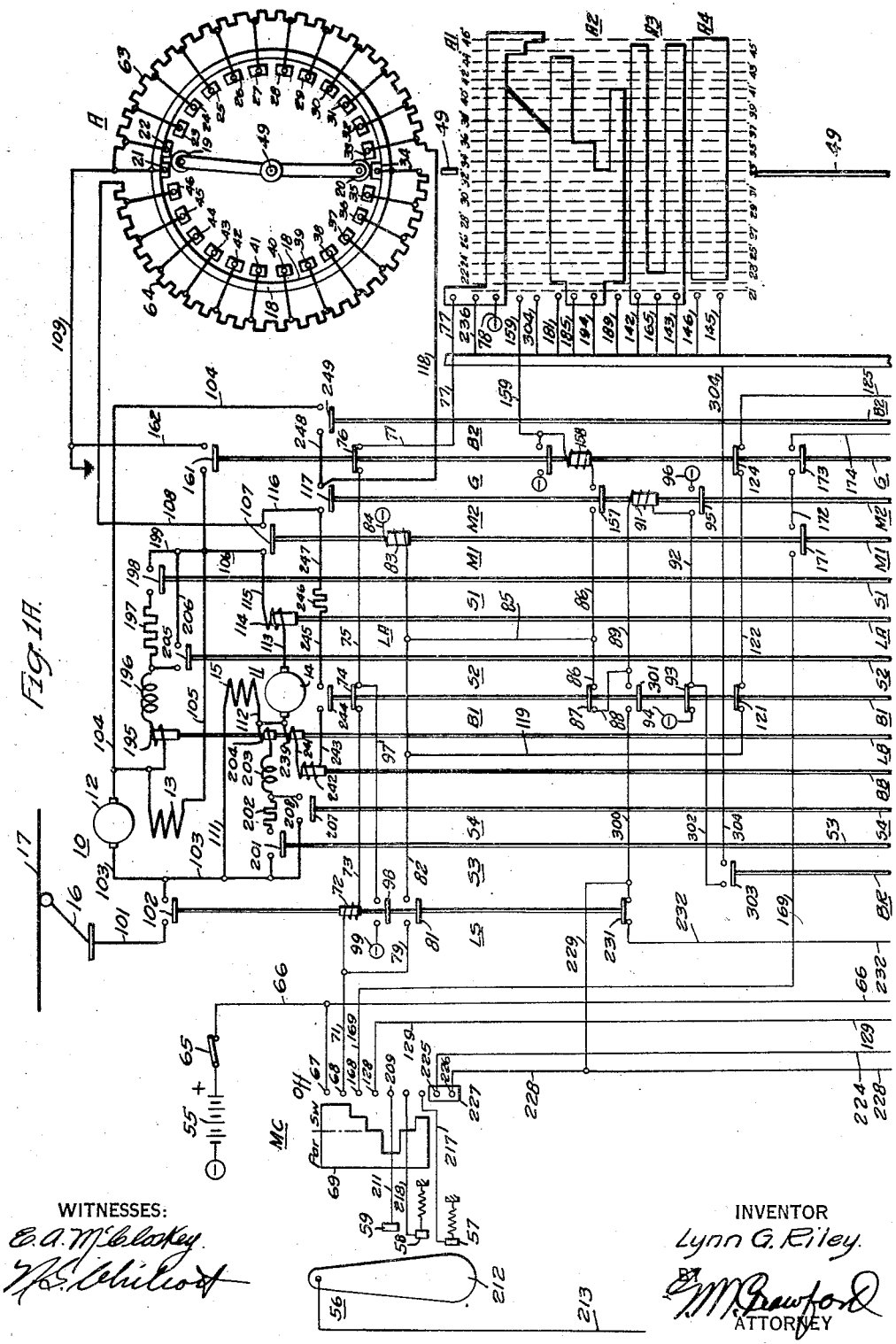

April 27, 1937.    L. G. RILEY    2,078,684
MOTOR CONTROL SYSTEM
Filed March 12, 1936    3 Sheets-Sheet 2

WITNESSES:

INVENTOR
Lynn G. Riley.
BY
ATTORNEY

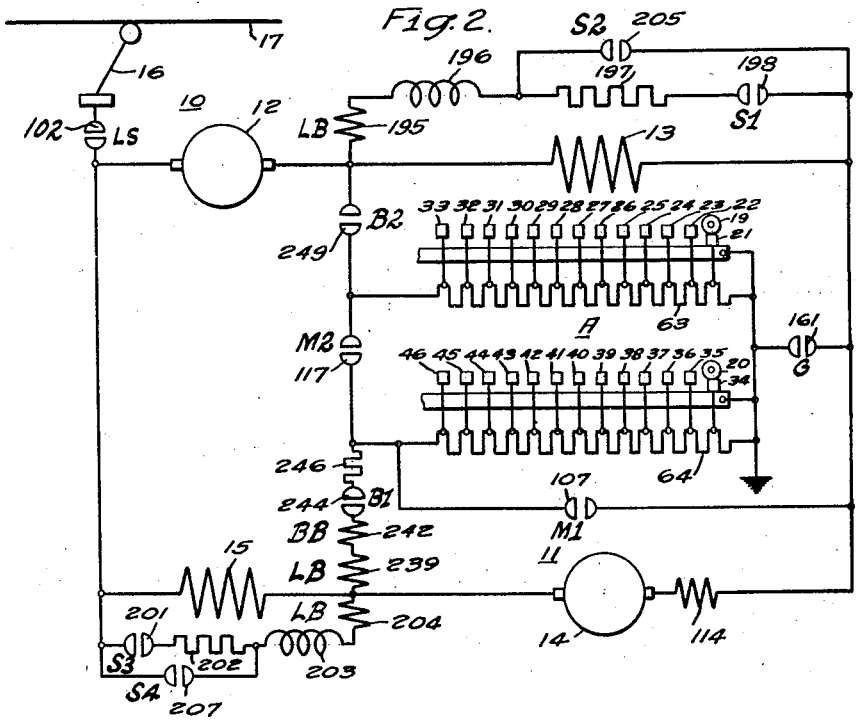

Patented Apr. 27, 1937

2,078,684

UNITED STATES PATENT OFFICE 2,078,684

MOTOR CONTROL SYSTEM

Lynn G. Riley, Pittsburgh, Pa., assignor to Westinghouse Electric & Manufacturing Company, East Pittsburgh, Pa., a corporation of Pennsylvania Application March 12, 1936, Serial No. 68,386

18 Claims. (Cl. 172—179)

My invention relates, generally, to motor control systems and more particularly to dynamic breaking systems for electrically-propelled vehicles.

An object of the invention, generally stated, is to provide an automatic control system for an electrically-propelled vehicle which shall be simple and efficient in operation and which may be economically manufactured and installed.

A more specific object of the invention is to provide a quick-acting dynamic braking system for an electrically-propelled vehicle.

Another object of the invention is to provide variable rates of dynamic braking for an electrically-propelled vehicle.

A still further object of the invention is to provide for so controlling the operation of a motor-driven accelerator during the acceleration and the deceleration of an electrically-propelled vehicle that smooth operation of the vehicle is obtained at all times.

Other objects of the invention will be explained fully hereinafter or will be apparent to those skilled in the art.

In accordance with the embodiment of the invention herein illustrated, both the acceleration and the deceleration of an electrically-propelled vehicle are primarily controlled by a motor-driven accelerator of the type described in my Patent No. 1,991,229, issued February 12, 1935, and assigned to the Westinghouse Electric & Manufacturing Company. The accelerator comprises a circular copper bus inside of which are disposed a plurality of contact fingers which are progressively forced against the bus by a pair of revolving rollers driven by a pilot motor. One half of the contact fingers are connected to one section of a two-section resistor, which is utilized to control the propelling motor current during both acceleration and deceleration of the vehicle, the other half of the contact fingers being connected to the other section of the resistor. Preselected rates of acceleration and deceleration are maintained by governing the operation of the pilot motor by means of limit relays, which are responsive to the main motor current, the accelerator resistors being so connected in the main motor circuits that they control the motor current during both acceleration and dynamic braking.

For a fuller understanding of the nature and objects of the invention, reference may be had to the following detailed description, taken in conjunction with the accompanying drawings, in which:

Figures 1A and 1B, when combined, constitute a diagrammatic view of a control system embodying the invention;

Fig. 2 is a schematic diagram showing the main circuit connections for the motors and control apparatus, and Fig. 3 is a chart, showing the sequence of operation of a portion of the apparatus illustrated in Figs. 1A, 1B and 2.

Referring to the drawings, a pair of electric motors 10 and 11 may be utilized for propelling a vehicle (not shown). The motor 10 is provided with an armature winding 12 and a series field winding 13. Likewise, the motor 11 is provided with an armature winding 14 and a series field winding 15. A line switch LS is provided for connecting the motors 10 and 11 to a trolley 16 which engages a power conductor 17 that may be energized from any suitable source of power, such as a generating station (not shown).

The motors 10 and 11 are connected in parallel circuit relation during acceleration of the vehicle and they may also be connected for dynamic braking with the field winding 15 of motor 11 connected across the armature 12 of motor 10 and the field winding 13 of motor 10 connected across the armature 14 of motor 11, thereby permitting the current in the armature windings to reverse and cause the motors to act as generators and decelerate the vehicle. A pair of switches B1 and B2 are provided for establishing the dynamic braking connections.

Both the acceleration and the deceleration of the motors 10 and 11 are primarily controlled by a motor driven accelerator A which is of the same general type as the one described in the aforementioned Patent No. 1,991,229. The accelerator A comprises a circular bus 18 inside of which are disposed a plurality of contact fingers 21 to 46, inclusive, which are progressively forced against the bus 18 by a pair of revolving rollers 19 and 20.

The rollers 19 and 20 are driven by a pilot motor 47 through shafts 48 and 49 connected by bevel gears 51. The pilot motor 47 is provided with an armature winding 52 and two field windings 53 and 54, one for each direction of rotation. An electrical braking or plugging circuit, which is fully described in the copending application of N. H. Willby, Serial No. 68,454, filed March 12, 1936, is provided for quick stopping of the pilot motor 47 when it is deenergized. The pilot motor is controlled by a pair of relays PR and PR1 and is energized directly from a source of control potential, such as a battery 55.

The speed of the pilot motor 47 during acceleration is controlled by an accelerating relay AR and also by a current limit relay LA, which is responsive to the traction motor current. The actuating coil of the relay AR is energized through a retardation controller 56 which is an inertia or pendulum device that responds to acceleration and deceleration impulses and is provided with contact members 57, 58 and 59, which are closed at predetermined settings. As fully described and claimed in my copending application, Serial No. 752,802, filed November 13, 1934, the retardation device 56 is utilized to maintain a uniform accelerating rate, regardless of the load on the vehicle, within certain limits.

The relay AR is energized at predetermined rates of acceleration, depending upon the position of a master controller MC. When the contact members of the relay AR are closed, a portion of a resistor 61, which is connected across the armature winding 52 of the pilot motor 47 when it is operating in the forward direction, is shunted, thereby reducing the speed of the pilot motor. The contact members of the current limit relay LA also shunt the resistor 61 in the event that the traction motor current becomes sufficient to operate the relay LA, thereby tending to maintain the accelerating current below a certain limit. A portion of a resistor 62 is connected in series with the pilot motor 47 for speed regulation of the motor.

The accelerator A is provided with resistors 63 and 64 for controlling the current in the motors 10 and 11. The resistor 63 is divided into a number of subdivisions which are connected to the contact fingers 21 to 33, inclusive, and the resistor 64 is divided into sub-divisions which are connected to the contact fingers 34 to 46, inclusive. The resistors 63 and 64 are connected in the motor circuit in parallel-circuit relation during acceleration and in series-circuit relation during dynamic braking.

As shown, a number of cam switches A1, A2, A3, and A4 are located in the accelerator and are actuated by the shaft 49. The reference numerals 21' to 46' indicate the contact fingers over which the rollers 19 and 20 travel while the cam switches are closed. The function of the cam switches in the control system will be explained more fully hereinafter.

In addition to the accelerator and the cam switches, numerous other switches are provided for performing certain switching operations. These include switches M1 and M2 for connecting the motors 10 and 11 to the resistors 63 and 64 during acceleration, a switch G for connecting one terminal of the motors directly to ground after the resistors 63 and 64 have been shunted from the motor circuits by the accelerator rollers, field shunting switches S1, S2, S3 and S4, and a braking relay BR, which permits dynamic braking to be applied.

The energization of the relay BR is controlled by a braking controller BC which may also be utilized to control the air braking system (not shown). The controllers MC and BC are electrically interlocked to prevent improper operation of the equipment.

In addition to the current limit relay LA, which functions to limit the motor current during acceleration by regulating the operation of the accelerator A, a similar relay LB is provided for limiting the motor current during dynamic braking. A limit relay BB is also provided for controlling the operation of the pilot motor 47 during coasting of the vehicle.

An immediate response of the dynamic braking action, when it is necessary to decelerate the vehicle, requires that there be available a generated voltage much higher and more stable than the residual voltage of the machines 10 and 11. It has been determined that for a short period of time after power is removed from the motors, their voltage is considerably higher than their normal residual voltage. Therefore, I provide for utilizing this voltage to insure a quick building up of dynamic braking current, when desired, by closing the dynamic braking switches immediately whenever power is shut off and permitting a small braking current to circulate during the entire coasting period. The retardation produced by the small circulating current is negligible and has no noticeable effect on the coasting characteristics of the car. The time required for brake application and build-up is shortened by having the braking switches already closed and by having available a stable voltage of considerable magnitude to cause the generated current to build up rapidly when it is desired to increase the braking effect.

The circulating current is held at a low value during coasting by utilizing the limit relay BB, which is set to operate at a low current, to control the operation of certain of the field shunting switches and to cause the pilot motor to advance or retract the accelerator in accordance with the car speed. In this manner, the accelerator is always in the correct position to properly control the motor current, and an immediate dynamic braking effect can be obtained by opening one or more of the field shunting switches to increase the excitation of the machines 10 and 11, which causes the generated current to increase, thereby increasing the braking effect.

With a view to enabling the operator of the vehicle to select different rates of dynamic braking, provision is made for controlling the operation of the field shunting switches S1, S2, S3 and S4 by means of the braking controller BC. In this manner, the operator may select a desired rate of braking by controlling the operation of the field shunting switches to vary the field excitation of the motors 10 and 11 during dynamic braking, thereby regulating the generated current. The limit relay LB, which controls the accelerator A during braking, is provided with additional coils which are energized by the current in the field shunting circuits in order that the relay will be calibrated for the different current values corresponding to the selected braking rates, thereby permitting the relay to control the accelerator to regulate the motor current over the entire braking range.

In order that the functioning of the foregoing apparatus may be more clearly understood, the operation of the system, particularly during dynamic braking, will be described in more detail.

Assuming that a control switch 65 has been closed, and that it is desired to accelerate the vehicle to the maximum speed, the master controller MC may be actuated to the parallel position, thereby applying power to the motors 10 and 11. When the controller MC is actuated to the parallel position, the switches LS, M1 and M2 are closed to connect the motors to the power source through the accelerator resistors 63 and 64. The energizing circuit for the switch LS may be traced from the positive terminal of the battery 55 through the control switch 65, conductor 66, contact fingers 67 and 68, bridged by a contact segment 69 on the controller MC, conductor 71, the actuating coil 72 of the switch LS, conductor 73, an interlock 74 on the switch B1, conductor 75, an interlock 76 on the switch G, conductor 77, and the cam switch A1 to a negative conductor 78.

Following the closing of the switch LS, the actuating coil of the switch M1 is energized through a circuit which extends from the previously energized conductor 71 through conductor 79, an interlock 81 on the switch LS, conductor 82, and the actuating coil 83 of the switch M1 to a negative conductor 84. At this time, the actuating coil of the switch M2 is energized through a circuit which extends from the conductor 82 through conductors 85 and 86, an interlock 87 on the switch B1, conductors 88 and 89, the actuating coil 91 of the switch M2, conductor 92 and an interlock 93 on the switch B1 to a negative conductor 94.

A holding circuit is established for the coil 91 through an interlock 95 on the switch M2, the coil 91 being connected to a negative conductor 96 by the closing of the interlock 95. A holding circuit for the actuating coil 72 of the switch LS is also established by the closing of the switch LS, the holding circuit extending from the interlock 74 on switch B1 through conductor 97 and an interlock 98 on the switch LS, to a negative conductor 99.

The closing of the switches LS, M1 and M2 connects the motors 10 and 11 in parallel-circuit relation, the circuit through the motor 10 extending from the power conductor 17 through the trolley 16, conductor 101, contact members 102 on the switch LS, conductor 103, the armature winding 12 of the motor 10, conductor 104, the field winding 13, conductors 105 and 106, contact members 107 on the switch M1, conductor 108, the accelerator resistor 64, contact finger 34, and the bus 18 to a grounded conductor 109.

The circuit through the motor 11 extends from the conductor 103 through conductor 111, the field winding 15, conductor 112, the armature winding 14, conductor 113, an actuating coil 114 of the limit relay LA, conductor 115, contact members 107 of the switch M1, conductor 116, contact members 117 of switch M2, conductor 118 and the resistor 63 to the grounded conductor 109.

Since it has been assumed that the controller MC is actuated to the parallel position for maximum acceleration, the relays PR and PR1 are energized to cause the pilot motor 47 to advance the accelerator rollers 19 and 20 to shunt the resistors 63 and 64 from the motor circuit. The energizing circuit for the actuating coil of the relay PR may be traced from the previously energized conductor 82 through conductor 119, an interlock 121 on the switch B1, conductor 122, an interlock 124 on the switch G, conductor 125 and the actuatng coil 126 of the relay PR to a negative conductor 127.

The energizing circuit for the actuating coil of the relay PR1 extends from a contact finger 128, which engages the segment 69 of the controller MC, through conductor 129, an interlock 131 on the switch M1, conductor 132, an interlock 133 on the switch M2, conductor 134, an interlock 135 on the switch G, conductor 136 and the actuating coil 137 of the relay PR1 to a negative conductor 138.

The closing of the relays PR and PR1 energizes the pilot motor 47 to advance the accelerator A. The energizing circuit for the pilot motor may be traced from the positive conductor 66, through the resistor 62, conductor 139, contact members 141 on the relay PR1, conductor 142, the cam switch A3 on the accelerator A, conductor 143, the field winding 53 and armature winding 52 to a negative conductor 144.

As explained hereinbefore, the pilot motor 47 advances the accelerator A under the control of the limit relay LA, the contact members of which are disposed to shunt a portion of the resistor 61 from the motor circuit, thereby regulating the operating speed of the motor. When the contact members of the relay LA are open, the resistor 61 is connected across the armature winding 52 of the motor 47 through a circuit which extends from the one terminal of the armature winding 52 through the field winding 54, conductor 145, the cam switch A4, conductor 146, contact member 147 of the PR relay, conductors 148 and 149, a coil 151 of the limit relay LA, conductor 152, and the resistor 61 to the negative conductor 144.

When the contact members of the relay LA are closed, a major portion of the resistor 61 is shunted from the parallel circuit, thereby decreasing the armature current of the motor and reducing its speed. The shunt circuit may be traced from the conductor 148 through conductor 153, contact members 154 of the limit relay LA, conductors 155 and 156 and a small portion of the resistor 61 to the negative conductor 144.

In this manner, the accelerator A is advanced to shunt the resistors 63 and 64 from the traction motor circuit, thereby accelerating the vehicle under the control of the limit relay LA. When the accelerator A nears the end of its travel in the forward direction, an energizing circuit is established for the actuating coil of the switch G, thereby closing this switch to connect one terminal of the motors 10 and 11 directly to ground. The energizing circuit for the actuating coil of the switch G may be traced from the previously energized conductor 86 through an interlock 157 on the switch M2, the actuating coil 158 of the switch G, conductor 159 and the cam switch A1, to the negative conductor 78.

The closing of the switch G connects the motors 10 and 11 directly to ground through a circuit which extends from the conductor 105 through contact members 161 on the switch G and conductor 162 to the grounded conductor 109. The closing of the switch G also opens the interlocks 124 and 135 on this switch to deenergize the relays PR and PR1, thereby causing the pilot motor 47 to operate in the reverse direction to return the accelerator rollers to the position shown in the drawings. The circuit for operating the motor 47 in the reverse direction may be traced from the resistor 62 through conductor 163, contact members 164 on the PR relay, conductor 146, the cam switch A4, conductor 145, the field winding 54 and armature winding 52 to the negative conductor 144.

Provision is made for shunting the armature winding 52 of the motor 47 before the accelerator reaches the end of its travel, thereby slowing down the speed of the motor. The shunting circuit may be traced from one terminal of the armature winding 52 through the field winding 53, conductor 143, the cam switch A3, conductor 165, contact members 166 of the relay PR1, conductor 167, and a portion of the resistor 61 to the negative conductor 144. The cam switches A3 and A4 function as limit switches to stop the pilot motor at the desired position by interrupting the energizing circuit, and also establishing an electrical braking circuit for the motor by shunting the armature through the parallel circuits previously traced.

As the accelerator A is being returned towards its original position, the field shunting switches S1, S2, S3 and S4 are closed in sequential relation to shunt the field windings of the traction motors, thereby causing them to operate at their maximum speed. The energizing circuit for the actuating coil of the switch S1 may be traced from a contact finger 168, which engages the segment 69 of the controller MC, through conductor 169, an interlock 171 on the switch M1, conductor 172, an interlock 173 on the switch G, conductor 174, contact fingers 175 and 176, bridged by a segment 177 on the controller BC, conductor 178, the actuating coil 179 of the switch S1, conductor 181 and the cam switches A2 and A1 to the negative conductor 78.

The energizing circuit for the actuating coil of the switch S2 may be traced from a contact finger 182 on the controller BC through conductor 183, the actuating coil 184 of the switch S2, conductor 185, and cam switches A2 and A1 to the negative conductor 78.

The circuit for the coil of the switch S3 extends from a contact finger 186 on the controller BC through conductor 187, the coil 188 of the switch S3, conductor 189, and the cam switches A2 and A1 to the negative conductor 78.

The energizing circuit for the actuating coil of the switch S4 extends from a contact finger 191 on the controller BC through conductor 192, the coil 193 of the switch S4, conductor 194 and the cam switches A2 and A1 to the negative conductor 78.

As shown, the closing of the switch S1 connects a combined reactive and resistance shunt across the field winding 13 of the motor 10, the shunt circuit extending from the conductor 104 through a coil 195 on the limit relay LB, a reactor 196, a resistor 197, contact members 198 of the switch S1, and conductors 199 and 105 to the other terminal of the field winding 13.

Likewise, the closing of the switch S3 connects a similar shunt across the field winding 15 of the motor 11. The shunt circuit extends from one terminal of the field winding 15 through conductors 111 and 103, contact members 201 of the switch S3, a resistor 202, a reactor 203, and a coil 204 on the relay LB to the other terminal of the field winding 15.

The closing of the switch S2 removes the resistor 197 from the shunt circuit around the field winding 13, thereby further decreasing the field strength of the motor 10. The shunt circuit around the resistor 197 extends from the one terminal of the resistor through contact members 205 of the switch S2, and conductor 206 to the conductor 199.

Likewise, the closing of the switch S4 removes the resistor 202 from the shunt circuit for the field winding 15. The circuit around the resistor 202 extends from the conductor 103 through contact members 207 of the switch S4, and conductor 208 to the connection between the resistor 202 and the reactor 203.

As explained hereinbefore, the pendulum device 56 functions to maintain a predetermined rate of acceleration by controlling the operation of the relay AR, which, in turn, governs the operating speed of the pilot motor 47 while it is driving the rollers 19 and 20 to shunt the resistors 63 and 64 from the traction motor circuit. The relay AR and the limit relay LA both govern the speed of the pilot motor by establishing shunt circuits around the armature of the pilot motor, as previously described.

Since it has been assumed that the controller MC is set for maximum acceleration, it is necessary for the pendulum device 56 to swing to a position in which it engages the contact members 59 in order to energize the relay AR through a circuit which extends from a contact finger 209 on the controller MC, through conductor 211, contact member 59, the pendulum 212, conductor 213, and the actuating coil 214 of the relay AR to a negative conductor 215. The closing of the contact members of the relay AR establishes a shunt circuit around the armature winding 52 of the pilot motor 47, which reduces the speed of the pilot motor. This circuit extends from one terminal of the armature winding 52 through a circuit previously traced to the conductor 148, thence through the contact members 216 of the relay AR, and conductor 156 through a portion of the resistor 61 to the negative conductor 144. In this manner, the pendulum device 56 functions to maintain a predetermined rate of acceleration, the rate being selected by the operator of the vehicle by setting the controller MC to energize one of the contact members 57, 58 or 59 through conductors 217, 218 or 211, respectively.

If it is desired to permit the vehicle to coast, the motors 10 and 11 may be disconnected from the power source by actuating the controller MC to the "off" position, thereby deenergizing the switches LS, M1, M2 and G. As explained hereinbefore, the braking switches B1 and B2 are closed immediately when the controller MC is actuated to the "off" position, thereby establishing the dynamic braking conections and causing a small current to circulate through the motors during coasting of the vehicle. However, the circulating current is of such a low value that it does not materially affect the coasting characteristics of the car.

The energizing circuit for the actuating coil of the switch B1 may be traced from the positive conductor 66 through contact fingers 221 and 222, bridged by a segment 223 on the controller BC, conductor 224, contact fingers 225 and 226, bridged by a segment 227 on the controller MC, conductors 228 and 229, an interlock 231 on the switch LS, conductors 232 and 233, the actuating coil 234 of the switch B1, conductors 235 and 236 and the cam switch A1 to the negative conductor 78. The energizing circuit for the actuating coil of the switch B2 extends from the conductor 233 through the coil 237 of the switch B2 and thence to the negative conductor 78 through the circuit just previously traced. A holding circuit for the coils 234 and 237 is established through an interlock 238 on the switch B2.

The closing of the switches B1 and B2 establishes dynamic braking connections for the motors 10 and 11 whereby the field winding 13 of the motor 10 is connected across the armature 14 of the motor 11 and the field winding 15 of the motor 11 is connected across the armature 12 of the motor 10, thereby causing the motors to function as generators which are driven by the momentum of the vehicle. The circuit for the field winding 15 may be traced from one terminal of the armature 12 through conductor 103, conductor 111, the field winding 15, conductor 112, a coil 239 of the limit relay LB, conductor 241, a coil 242 of the limit relay BB, conductor 243, contact members 244 of the switch B1, conductor 245, a resistor 246, conductors 247, 116 and 108, the resistor 64 on the accelerator A, contact finger 34, the bus 18, contact finger 21, the resistor 63, conductors 118 and 248, contact members 249 of the switch B2, and conductor 104 to the other terminal of the armature 12.

The circuit through the field winding 13 may be traced from the one terminal of the armature 14 of the motor 11 through the coil 239 of the relay LB, conductor 241, the coil 242 of the relay BB, conductor 243, contact members 244 of the switch B1, conductor 245, the resistor 246, conductors 247, 116 and 108, the resistor 64, contact finger 34, the bus 18, contact finger 21, the resistor 63, conductors 118 and 248, contact members 249 of the switch B2, conductor 104, the field winding 13, conductors 105, 106 and 115, the coil 114 of the relay LA and conductor 113 to the other terminal of the armature 14.

As explained hereinbefore, the closing of the switches B1 and B2 immediately upon the actuation of the controller MC to the "off" position, utilizes the relatively high voltage of the motors 10 and 11, which is available for a short time after power is shut off, to cause the motors to start generating current immediately without the time lag previously required for the voltage of the machines to build up from the low residual voltage present after the machines have been disconnected from the power source for a considerable length of time, while the vehicle has been coasting, as has been the prior practice. However, the generated current is maintained at a small value by the action of the accelerator A, which is under the control of the limit relay BB during coasting, the relay being set to operate at a relatively low value of current.

Furthermore, the field shunting switches S2, S3 and S4 are closed during coasting to weaken the field strength of the machines 10 and 11, thereby tending to maintain a low value of generated current. However if desired, the system may be modified to close the field shunting switch S1 during coasting to further reduce the generated current.

The energizing circuit for the actuating coil of the switch S2 may be traced from the previously energized conductor 228 through conductor 251, an interlock 252 on the relay BR, conductor 253, an interlock 254 on the switch B1, conductors 255 and 174, contact fingers 175 and 182, bridged by the segment 177 of the controller BC, conductor 183, the actuating coil 184 of the switch S2, conductors 185 and 256, and an interlock 257 on the switch B2 to a negative conductor 258.

The energizing circuit for the actuating coil of the switch S3 extends from a contact finger 186 on the controller BC through conductor 187, the coil 188 of the switch S3, conductors 189 and 259, and an interlock 261 on the switch B2 to a negative conductor 262.

The circuit for the actuating coil of the switch S4 extends from the contact finger 191 on the controller BC through conductor 192, the coil 193, conductors 194 and 263, and an interlock 264 on the switch B2 to a negative conductor 265.

Since the current generated by the machines 10 and 11 during coasting is proportional to the speed of the car, this current may be utilized for spotting the accelerator A, that is, for matching the position of the accelerator with the speed of the vehicle, thereby insuring that the accelerator will be in the proper position to prevent an excessive rush of current in the event that power is reapplied to the motors or dynamic braking is put into effect. As previously stated, the accelerator is under the control of the limit relay BB during coasting. This relay functions to control the operation of the relays PR and PR1, which control the direction of operation of the pilot motor 47. In this manner, the accelerator is either advanced or retracted as the vehicle loses or gains in speed.

As explained hereinbefore, the pilot motor 47 is operated in the forward direction when the relays PR and PR1 are both energized and it is operated in the reverse direction when both relays are deenergized. Therefore, the pilot motor is controlled by the action of the relay BB, which controls the energization of the relays PR and PR1 during coasting. When the relay BB is in its lowermost position, the relay PR1 is energized through a circuit which may be traced from the previously energized conductor 232 through conductor 266, contact members 267 of the relay BB, conductor 268, an interlock 269 on the relay B1, conductor 271, an interlock 272 on the switch M2, conductors 273 and 136 and the coil 137 on the relay PR1 to the negative conductor 138.

The energizing circuit for the actuating coil of the relay PR may be traced from the conductor 232, through contact members 274 of the relay BB, conductor 275, an interlock 276 on the switch M2, conductor 277, an interlock 278 on the switch B2, conductor 125, and the actuating coil 126 of the relay PR to the negative conductor 127. When the circulating current in the motor circuit exceeds a predetermined value, the relay BB operates to interrupt the circuits for the relays PR and PR1, thereby reversing the pilot motor 47. In this manner, the operation of the accelerator during coasting is so controlled that it is in the correct position to control the motor current in the event that dynamic braking action is required.

In the event that dynamic braking is required to decelerate the vehicle, the controller BC may be actuated to one of the braking positions, thereby energizing the relay BR, which removes the accelerator A from the control of the limit relay BB and places it under the control of the limit relay LB, which is set for a higher current value and, therefore, permits the generated current to be increased, thereby increasing the dynamic braking action of the motors 10 and 11. The energizing circuit for the coil of the relay BR may be traced from the previously energized conductor 228 through contact fingers 281 and 282, bridged by segment 283 on the controller BC, conductor 284, and the actuating coil 285 of the relay BR to a negative conductor 286.

The closing of the relay BR establishes shunt circuits around the contact members of the limit relay BB, which previously controlled the energization of the relays PR and PR1. The one shunt circuit may be traced from the conductor 275, through conductor 287, contact members 288 on the relay BR, conductors 289, 228, 229, interlock 231 of the switch LS, and conductor 232 to the contact member 274 of the relay BB. The other shunt circuit may be traced from the conductor 268 through conductor 291, contact members 292 of the relay LB, conductor 293, contact members 294 of the relay BR, and conductors 295, 232 and 266 to the contact members 267 of the relay BB. In this manner, the operation of the pilot motor is placed under the control of the limit relay LB during dynamic braking. This relay functions to control the operation of the relay PR1 to stop the pilot motor in the event that the traction motor current exceeds a predetermined value. Inasmuch as it is desirable to operate the pilot motor at a lower speed during dynamic braking, the speed of the pilot motor during dynamic braking is reduced by the closing of an interlock 296 on the switch M1 to shunt a major portion of the resistor 61 from the armature circuit. This shunt circuit may be traced from the one terminal of the armature 52 through a circuit previously traced to the conductor 153, thence through the interlock 296, conductors 297 and 156, and the resistor 61 to the other terminal of the armature 52.

As explained hereinbefore, the dynamic braking rate may be controlled by the operator by actuating the controller BC to control the operation of the field shunting switches S1, S2, S3, and S4, thereby varying the field strength of the machines 10 and 11 to increase or decrease the generated current. Since the energizing circuits for the actuating coils of the switches S1, S2, S3 and S4 have been previously traced, it is believed to be unnecessary to trace the circuits at this time. It will be seen that the contact members 252 on the relay BR, which is open during dynamic braking is paralleled by contact members 279 on the relay BB, which is closed during braking, thereby permitting the energizing circuits for the field shunting switches to be established through the controller BC, as previously explained. The drum development of the segment 177 on the controller BC is such that the operation of the field shunting switches may be controlled by means of the controller.

In order that the calibration of the limit relay LB may be changed in accordance with the variation in field strength obtained by means of the field shunting circuits, the relay is provided with the coils 195 and 204, which are connected in the respective field shunting circuits for the machines 10 and 11. In this manner, the relay LB is recalibrated to permit the relay to properly control the accelerator at the required current values for the various rates of dynamic braking obtainable by the field shunting action.

It will be noted that the switch M2 is closed when the accelerator resistors 63 and 64 have been shunted from the motor circuit during dynamic braking. The closing of the switch M2 shunts the resistors from the motor circuit, thereby permitting the accelerator to be returned to its original position, in order that it will be in the correct position to permit power to be reapplied to the motors. The energizing circuit for the actuating coil of the switch M2 extends from the previously energized conductor 229, through conductor 300, an interlock 301 on the switch B1, conductor 89, the coil 91 of the switch M2, conductors 92 and 302, contact members 303 of the relay BR, conductor 304 and the cam switch A1 to the negative conductor 78. A holding circuit for the coil of the switch M2 is established by the closing of the switch. This holding circuit has been previously traced, and will not be traced at this time.

The closing of the switch M2 interrupts the energizing circuits for the actuating coils of the relays PR and PR1, thereby causing the pilot motor to be operated in the reverse direction to return the accelerator to its original position, as hereinbefore explained.

From the foregoing description, it is apparent that I have provided a control system which will cause the propelling motors of an electric vehicle to be accelerated rapidly and smoothly. It is also evident that I have provided for smoothly and effectively decelerating the vehicle by means of dynamic braking. A quick response of the dynamic braking action at all times is insured by the control system herein disclosed, and the operator is enabled to vary the rate of dynamic braking as well as the rate of acceleration of the vehicle.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, a source of power for the motor, switching means for connecting the motor to the power source, and switching means for establishing dynamic braking connections for the motor, said dynamic braking connections being established during initial coasting of the vehicle to permit a current to circulate through the motor.

2. In a motor control system, in combination, a motor for propelling a vehicle, a source of power for the motor, switching means for connecting the motor to the power source, switching means for establishing dynamic braking connections for the motor, said dynamic braking connections being established during initial coasting of the vehicle to permit a current to circulate through the motor, and resistance-varying means for limiting the motor current during coasting.

3. In a motor control system, in combination, a motor for propelling a vehicle, a source of power for the motor, switching means for connecting the motor to the power source, switching means for establishing dynamic braking connections for the motor, said dynamic braking connections being established during initial coasting of the vehicle to permit a current to circulate through the motor, resistance-varying means for limiting the motor current during coasting, and means responsive to said motor current for controlling the operation of the resistance-varying means.

4. In a motor control system, in combination, a motor for propelling a vehicle, a source of power for the motor, switching means for connecting the motor to the power source, switching means for establishing dynamic braking connections for the motor, control means for controlling the operation of said switching means to establish the dynamic braking connections when the motor is disconnected from the power source to permit coasting of the vehicle, and variable means for limiting the motor current to a predetermined value during coasting of the vehicle.

5. In a motor control system, in combination, a motor for propelling a vehicle, a source of power for the motor, switching means for connecting the motor to the power source, resistance-varying means for controlling the motor current, switching means for establishing dynamic braking connections for the motor, and control means for controlling the operation of said switching means to establish the dynamic braking connections when the motor is disconnected from the power source, said resistance-varying means being disposed to limit the motor current during coasting of the vehicle.

6. In a motor control system, in combination, a motor for propelling a vehicle, a source of power for the motor, switching means for connecting the motor to the power source, resistance-varying means for controlling the motor current, switching means for establishing dynamic braking connections for the motor, control means for controlling the operation of said switching means to establish the dynamic braking connections when the motor is disconnected from the power source, said resistance-varying means being disposed to limit the motor current during coasting of the vehicle, and means responsive to said motor current for controlling the operation of the resistance-varying means.

7. In a motor control system, in combination, a motor for propelling a vehicle, said motor having an armature winding and a field winding, a source of power for the motor, switching means for connecting the motor to the power source, switching means for establishing dynamic braking connections for the motor, control means for controlling the operation of said switching means, and variable means for shunting the field winding of the motor during dynamic braking to vary the braking effect.

8. In a motor control system, in combination, a motor for propelling a vehicle, said motor having an armature winding and a field winding, a source of power for the motor, switching means for connecting the motor to the power source, switching means for establishing dynamic braking connections for the motor, control means for controlling the operation of said switching means, and variable means for shunting the field winding of the motor during dynamic braking to vary the braking effect, said variable shunting means being controlled by said control means.

9. In a motor control system, in combination, a motor for propelling a vehicle, said motor having an armature winding and a field winding, a source of power for the motor, switching means for connecting the motor to the power source to accelerate the motor, resistance-varying means for controlling the motor current, switching means for establishing dynamic braking connections for the motor, control means for controlling the operation of said switching means, variable means for shunting the field winding of the motor during dynamic braking to vary the braking effect, and relay means responsive to the dynamic braking current for controlling the operation of said resistance-varying means.

10. In a motor control system, in combination, a motor for propelling a vehicle, said motor having an armature winding and a field winding, a source of power for the motor, switching means for connecting the motor to the power source to accelerate the motor, resistance-varying means for controlling the motor current, switching means for establishing dynamic braking connections for the motor, control means for controlling the operation of said switching means, variable means for shunting the field winding of the motor during dynamic braking to vary the braking effect, relay means responsive to the dynamic braking current for controlling the operation of said resistance-varying means, and means energized by the current in the field shunting means for recalibrating said relay means.

11. In a motor control system, in combination, a motor for propelling a vehicle, a source of power for the motor, switching means for connecting the motor to the power source, switching means for establishing dynamic braking connections for the motor, said dynamic braking connections being established when the motor is first disconnected from the power source to permit a current to circulate through the motor during coasting of the vehicle, means for limiting the circulating current to a predetermined value during coasting, and means responsive to said circulating current for controlling the operation of said current limiting means while the vehicle is coasting.

12. In a motor control system, in combination, a motor for propelling a vehicle, a source of power for the motor, switching means for connecting the motor to the power source, switching means for establishing dynamic braking connections for the motor, said dynamic braking connections being established when the motor is first disconnected from the power source to permit a current to circulate through the motor during coasting of the vehicle, variable-resistance means connected in the motor circuit during coasting of the vehicle, means for operating said variable-resistance means to limit the circulating current, and means responsive to said circulating current for controlling the operation of said operating means in accordance with the speed of the vehicle during coasting.

13. In a motor control system, in combination, a motor for propelling a vehicle, a source of power for the motor, switching means for connecting the motor to the power source, switching means for establishing dynamic braking connections for the motor, said dynamic braking connections being established when the motor is first disconnected from the power source to permit a current to circulate through the motor during coasting of the vehicle, a controller connected in the motor circuit during coasting of the vehicle, means for operating said controller to limit the circulating current, and relay means responsive to said circulating current for controlling said operating means to govern the position of said controller in accordance with the speed of the vehicle during coasting.

14. In a motor control system, in combination, a motor for propelling a vehicle, a source of power for the motor, means for connecting the motor to and disconnecting it from the power source, a controller for controlling the motor current, switching means for establishing a closed circuit for the motor when it is disconnected from the power source to permit a current to circulate through the motor during coasting of the vehicle, said controller being connected in said motor circuit to limit the circulating current, and means responsive to said circulating current for controlling the operation of said controller during coasting of the vehicle.

15. In a motor control system, in combination, a motor for propelling a vehicle, a source of power for the motor, means for connecting the motor to and disconnecting it from the power source, a controller for controlling the motor current, switching means for establishing a closed circuit for the motor when it is disconnected from the power source to permit a current to circulate through the motor during coasting of the vehicle, said controller being connected in said motor circuit to limit the circulating current, and relay means responsive to said circulating current for controlling the operation of said controller in accordance with the speed of the vehicle during coasting.

16. In a motor control system, in combination, a motor for propelling a vehicle, said motor having an armature winding and a field winding, a source of power for the motor, switching means for connecting the motor to the power source, switching means for establishing dynamic braking connections for the motor when it is first disconnected from the power source to permit a current to circulate through the motor during coasting of the vehicle, a controller for limiting the circulating current during coasting, and means for increasing the current in the field winding to increase said circulating current thereby producing a dynamic braking effect on the vehicle.

17. In a motor control system, in combination, a motor for propelling a vehicle, said motor having an armature winding and a field winding, a source of power for the motor, switching means for connecting the motor to the power source, switching means for establishing dynamic braking connections for the motor when it is first disconnected from the power source to permit a current to circulate through the motor during coasting of the vehicle, a controller for limiting the circulating current during coasting, means for increasing the current in the field winding to increase said circulating current thereby producing a dynamic braking effect on the vehicle, and relay means responsive to the dynamic braking current for governing the operation of said controller during dynamic braking.

18. In a motor control system, in combination, a motor for propelling a vehicle, said motor having an armature winding and a field winding, a source of power for the motor, switching means for connecting the motor to the power source, switching means for establishing dynamic connections for the motor when it is disconnected from the power source to permit a current to circulate through the motor during coasting of the vehicle, field shunting means for decreasing the current in the field winding during coasting, a controller for limiting the circulating current during coasting, means for varying said field shunting means to increase said circulating current thereby producing a dynamic braking effect on the vehicle, relay means responsive to the dynamic braking current for governing the operation of said controller during dynamic braking, and means energized by the current in the field shunting means for recalibrating said relay means.

LYNN G. RILEY.